(12) United States Patent
Chavez

(10) Patent No.: US 10,250,534 B2
(45) Date of Patent: Apr. 2, 2019

(54) CLOUD-BASED UNIVERSAL COLLABORATIVE MESSAGING SYSTEM AND METHOD

(71) Applicant: Avaya, Inc., Santa Clara, CA (US)

(72) Inventor: David L. Chavez, Broomfield, CO (US)

(73) Assignee: Avaya Inc., Santa Clara, CA (US)

( * ) Notice: Subject to any disclaimer, the term of this patent is extended or adjusted under 35 U.S.C. 154(b) by 162 days.

(21) Appl. No.: 14/823,158

(22) Filed: Aug. 11, 2015

(65) Prior Publication Data

US 2017/0048172 A1 Feb. 16, 2017

(51) Int. Cl.
*H04L 12/58* (2006.01)

(52) U.S. Cl.
CPC ............ *H04L 51/066* (2013.01); *H04L 51/22* (2013.01); *H04L 51/36* (2013.01)

(58) Field of Classification Search
CPC ........ H04L 51/066; H04L 51/22; H04L 51/36
See application file for complete search history.

(56) References Cited

U.S. PATENT DOCUMENTS

| | | | | | |
|---|---|---|---|---|---|
| 4,612,416 A | * | 9/1986 | Emerson | ............... | H04M 3/533 379/88.18 |
| 4,646,346 A | * | 2/1987 | Emerson | ............... | H04M 3/537 379/214.01 |
| 4,837,798 A | * | 6/1989 | Cohen | ................. | G06Q 10/107 379/396 |
| 6,148,329 A | * | 11/2000 | Meyer | ..................... | H04L 51/36 709/206 |
| 6,301,245 B1 | * | 10/2001 | Luzeski | .................. | H04L 51/36 370/352 |
| 6,317,485 B1 | * | 11/2001 | Homan | ................... | H04L 51/24 379/88.12 |
| 6,396,907 B1 | * | 5/2002 | Didcock | ............. | H04M 3/5307 379/88.13 |
| 6,404,762 B1 | * | 6/2002 | Luzeski | .................. | H04L 51/36 370/230 |
| 8,238,526 B1 | * | 8/2012 | Seth | ..................... | H04M 1/7255 379/88.11 |
| 2005/0044144 A1 | * | 2/2005 | Malik | ..................... | H04L 51/04 709/205 |

(Continued)

FOREIGN PATENT DOCUMENTS

WO   WO 2014132246   9/2014

*Primary Examiner* — Uzma Alam
(74) *Attorney, Agent, or Firm* — Sheridan Ross P.C.

(57) ABSTRACT

Methods, devices, and systems are provided for converting messages received from different sources into a universal file management system format managed by a central server. Each message may be sent from a sender to at least one recipient in a communication system. Upon receiving the messages, the central server converts each message into at least one folder and file. The files or folders can be stored in a secure central repository or memory. The secure central repository may include directory-sync servicing to virtually a user communication device other than the server. Files or folders may be marked as sensitive and restricted from access, copying, or other distribution. Sensitive files and folders, representing messages received can be restricted to viewing via a real-time communication application running on a user's communication device and portal connection to the secure central repository.

20 Claims, 7 Drawing Sheets

(56) References Cited

U.S. PATENT DOCUMENTS

| | | | | |
|---|---|---|---|---|
| 2006/0239424 A1* | 10/2006 | Walter | ............... | H04M 3/42374 |
| | | | | 379/88.22 |
| 2007/0115936 A1* | 5/2007 | Newton | ................... | H04L 43/00 |
| | | | | 370/352 |
| 2007/0180067 A1* | 8/2007 | Schiffer | ............... | H04L 41/0803 |
| | | | | 709/220 |
| 2008/0215694 A1* | 9/2008 | Chen | ...................... | H04L 51/066 |
| | | | | 709/206 |
| 2009/0276789 A1* | 11/2009 | Wu | ......................... | G06F 9/546 |
| | | | | 719/313 |
| 2012/0210334 A1* | 8/2012 | Sutedja | ................. | G06Q 10/107 |
| | | | | 719/314 |
| 2013/0204947 A1* | 8/2013 | Guzman Suarez | ........................... | |
| | | | | G06F 17/30985 |
| | | | | 709/206 |
| 2014/0047054 A1* | 2/2014 | Rivkin | .................... | G06F 9/541 |
| | | | | 709/206 |
| 2015/0288821 A1* | 10/2015 | Seth | .................... | H04M 1/7255 |
| | | | | 379/88.11 |
| 2015/0356110 A1* | 12/2015 | Lin | ................... | G06F 17/30171 |
| | | | | 707/704 |
| 2015/0356116 A1* | 12/2015 | Lin | ................... | G06F 17/30212 |
| | | | | 707/613 |
| 2016/0344679 A1* | 11/2016 | Lane | ..................... | G06F 17/212 |

\* cited by examiner

CLOUD-BASED UNIVERSAL COLLABORATIVE MESSAGING SYSTEM AND METHOD

FIELD OF THE DISCLOSURE

The present disclosure is generally directed toward communication systems.

BACKGROUND

In the early days of messaging, inventors sought to unify the user experience by using one messaging system type to access limited information about messages contained on other systems. An example of this type of integrated message service system was taught in U.S. Pat. Nos. 4,612,416 and 4,646,346 to Emerson et al. Each of these patents generally describe a telephony system that can access a plurality of message service systems, maintain a message access status, and the ability to forward the message access status to an accessing user.

Another invention, described in U.S. Pat. No. 4,837,798 to Cohen et al., describes a unified messaging system where voice messages, email messages, and facsimiles were all sent to a single inbox. In general, this patent teaches the use of Automatic Speech Recognition (ASR) and Text to Speech (TTS) to allow compatibility with a particular device that the user decided to make the prime message receptor. More specifically, the patent describes providing for a single electronic mailbox for different types of messages.

With the innovation of Instant Messaging (IM), another issue arose in the form of many IM products using their own proprietary, and many times incompatible clients. In addition, the innovation of social media communication has exacerbated this problem. Efforts were made in the form of Adium, a free instant messaging application, and other clients that could unify chats for various messengers such as AIM, MSN/Windows Live™ Messenger, Yahoo!®, Messenger, Google Talk, Jabber, LiveJournal™, Facebook®, Bonjour, etc. These applications and clients allowed one directory of users, one window for chats, and one client to work with multiple messaging systems.

All of these innovations sought in various ways to improve communications and/or unify access to the plurality of message types and clients.

SUMMARY

With the rapid adoption and proliferation of smart phones and Bring Your Own Device (BYOD) uses, there is a problem that users either cannot or do not want to have client proliferation on their devices. Also, there is an additional opportunity to continue unification of all messages into a single clientless application. What is desired is a single store for all messages where they are rendered as a file and can have attachments rendered as associated files with information about importance, content, originator, sensitivity, Digital Rights Management (DRM), access permissions/trust and other key metadata easily rendered.

It is with respect to the above issues and other problems that the embodiments presented herein were contemplated. Among other things, the present disclosure solves these and other issues by providing a cloud-based universal collaborative messaging system and method operable to convert messages into one or more folders and/or files. These folders and/or files can be managed by a file management application of a device operating system (OS). The files or folders can be stored in a secure central repository with directory-sync servicing to virtually any kind of device and/or OS. Among other things, at least one analytic service may create filenames for the messages and apply digital rights access management (DRAM) based on the sensitivity of the content for flexible security.

In one embodiment, the universal collaborative messaging system can change every message with attachments into a folder and any attachments can be changed into individual files. A text portion of each message may be included with the folder. The universal collaborative messaging system may utilize a secure central repository with directory-sync servicing to virtually any kind of device and/or OS (e.g., Box, Dropbox, Drive, iCloud, etc.). In some embodiments, an analytic service creates a filename for the message based on a summary of the content and originator. The analytic service may be configured to apply DRAM based on who can actually read or delete the message and/or based on the sensitivity of the content.

The universal collaborative messaging system may be configured to receive messages (e.g., text messages, emails, short message service (SMS) messages, chats, instant messages, etc.) from one or more sources, service providers, and/or clients. In one embodiment, authentication information associated with different services may be provided to the universal collaborative messaging system, such that the universal collaborative messaging system can automatically receive messages from each service providing the messages. When the messages are received, the universal collaborative messaging system may translate or transform each message into a file or folder including the text portion of the message and attachments as individual files. This translation, or conversion, may include changing the data or content associated with each message (e.g., including metadata, actual data, etc., and/or combinations thereof) into a file or folder that is recognized by an OS file management system (e.g., Windows Explorer, Apple Finder, Linux file managers, other OS file managers, etc., and/or combinations thereof). Among other things, this conversion can distill the essential information of each message into a simplified format that is not platform, or application, specific. For instance, because the essential information is read, extracted, and converted into a universal OS file management system format, the size of each message can be dramatically reduced. Converting each message into a universal OS file management system format may include extracting the essential information associated with each message from the proprietary message formatting and packaging associated with a particular client, source, platform, and/or service.

In some embodiments, the universal collaborative messaging system may name each file or folder using metadata associated with the message. This file and/or folder name may be configured to show the originator of the message, the recipient or recipients of the message, content of the message, and/or other information that makes the file and/or folder easily recognizable. By way of example, a message may be sent from Alice to Bob using Messaging Client concerning Alice's birthday party occurring on the upcoming weekend. Bob may be registered, or may have previously registered, his credentials and/or authentication information (e.g., username, password, etc.) for Messaging Client with the universal collaborative messaging system. In this example, the universal collaborative messaging system may receive the message and automatically convert it into a universal OS file management system format. While extracting the essential information from the received message, the universal collaborative messaging system may analyze the various fields and/or metadata of the message including, but not limited to, one or more of the recipient or group of recipients, the sender, the subject, the content of the message, a sensitivity of the message if any, an urgency of the message, times associated with the message (e.g., when sent, when received, included in the content of the message, and/or combinations thereof and the like), size of the message, number of attachments, etc. Continuing this example, the universal collaborative messaging system may determine to name the file in this case "Alice-Bob_Party_Month-Day-Year."

It is an aspect of the present disclosure that each message may be named, arranged, grouped, and/or otherwise organized by one or more of the received message subject, thread, date, content, metadata, sensitivity, recipient, group of recipients, sender, group of senders, etc. For instance, in the "Alice's party" example described above, the universal collaborative messaging system may receive a number of messages exchanged between Alice and Bob. In some embodiments, the individual messages in the message thread between Alice and Bob may be converted to individual files via the universal collaborative messaging system. In one embodiment, the individual files may be associated with or stored in a topic folder created by the universal collaborative messaging system. The topic folder may be named by the universal collaborative messaging system in a similar manner as described above. Additionally or alternatively, each of the individual files in the folder may be named along with a time of sending and/or receiving (e.g., "Alice-Bob_Party_Month-Day-Year_TimeSent," etc.).

The universal collaborative messaging system may utilize a repository for the files and/or folders in a secure central location. This repository may include directory synchronization servicing to one or more devices and OS. Examples of the repository may include at least one database, file management system, or other cloud-based storage platform such as those associated with Box, Dropbox, Drive, OneDrive, iCloud, etc. In some embodiments, the repository may be associated with the universal collaborative messaging system and similarly located on the cloud (e.g., across a communication network in a secure central location, etc.).

It is an aspect of the present disclosure that analytics may be employed to prioritize files and/or folders created by the universal collaborative messaging system. For example, files and/or folders may be prioritized based on one or more of importance to the customer, sensitivity, encryption (if needed), etc. The universal collaborative messaging system may further render an analytic of personal behavior or context based on the messages received.

In some embodiments, the universal collaborative messaging system may provide dynamic DRAM for messages that have been converted into one or more files and folders. Among other things, the dynamic DRAM may provide the ability for the universal collaborative messaging system to adapt to changing conditions. For instance, the DRAM provided by the universal collaborative messaging system can be configured to alter, arrange, and/or organize the files and folders available to a particular user based on a dynamically changing context associated with the files and/or folders. The dynamically changing context may include a change to sensitivity of a message over time, a change in urgency of a message over time, a change to one or more members in a group, a change to an access level associated with the message, and/or other fields which can be changed dynamically. By way of example, users in an organization may be sending emails, text messages, and/or engaging in chats related to a number of topics. One of these topics may be related to the development of a new product for the organization. At some time after the messages have been sent, the organization may determine that the development of the new product should remain as company confidential, top secret, or be associated with some other type of restricted access. In a traditional messaging system, recalling the messages or otherwise restricting access to the messages by one or more individuals, servers, etc., after the messages have been delivered would be extremely difficult, if not impossible to implement. Embodiments of the present disclosure allow the universal collaborative messaging system to dynamically change, inter alia, the sensitivity and/or access associated with one or more files and folders stored in the repository. This change may serve to restrict access, viewing, or other searching by one or more unauthorized entities, users, devices, etc.

In some embodiments, the universal collaborative messaging system may utilize hierarchical file structures and access. With a hierarchical file structure and access, the universal collaborative messaging system can avoid the need for multiple clients and requiring to change applications to parse all messages and/or types of messages. The universal collaborative messaging system can allow sharing, including with persons outside of an enterprise or other entity that may not typically have had the ability to share. Moreover, since the new message is in the form of one or more simplified files and folders, the new message (i.e., files and/or folders) can be easily viewed or rendered by any client software or even natively by some OS's.

In one embodiment, the translated or transformed message may be configured to stay in the repository and be restricted from copying, synchronizing, or otherwise transferring to another storage medium. This restriction may be based on sender preferences, policies, and/or a sensitivity applied by the DRAM analytic service of the universal collaborative messaging system. In some cases, viewing access of the restricted messages may be allowed only when using a real-time communications viewer (e.g., WebRTC viewer, etc.). In any event, the DRAM module of the universal collaborative messaging system may include a time-to-live associated with a particular message. Additionally or alternatively, a sender and/or a policy may modify, revoke, or otherwise alter the viewing rights associated with one or more messages. Among other things, this dynamic ability to control access to messages can provide flexible security in a messaging environment.

Different levels of encryption can be used on the files and/or folders individually or as groups. Moreover, the levels of encryption can be based on sender, recipient, content sensitivity, country of origin, country of the repository, combinations thereof, and the like.

The types of analytics applied to the message file creation, interpreting sensitivity policy, and enforcement of DRAM can increase the usability and popularity of the universal collaborative messaging system. For example, a user may have an SMS identity (e.g., bound to the user's cell phone number), an email identity bound to the user's work address, and an instant messaging (IM) identity bound to a salesforce identity. The universal collaborative messaging system may be allowed to passively receive the user's messages, from one or more of these identities, as a client. These messages can be securely stored on a shared memory platform (e.g., Dropbox, Drive, iCloud, or other cloud storage platform). When the user wishes to access the universal collaborative messaging system managed messages from the user's smartphone, a secure association with the universal collaborative messaging system and the cloud storage platform can be established. Non-sensitive messages can be accessible from a synchronized directory that the user's phone (or other device) can automatically pull using cloud storage platform synchronization techniques. A converged client application can provide a user with an alert and render the message. The metadata for a user's sensitive messages can also be delivered to the user's phone in a similar manner, allowing the client to render the message summary and other information the user may need (e.g., the sender's identity, etc.).

In some embodiments, a sensitive message itself may not be synchronized to the phone (e.g., because the message is considered to be sensitive). The client application running on the device (e.g., smartphone, tablet, computer, mobile device, etc.) instead may be required to launch a real-time communications session (e.g., WebRTC, etc.) with the universal collaborative messaging system server. The real-time link can allow the user to experience the message from a host without actually transmitting the message itself to the user. In other words, this sensitive message is not copied. In some embodiments of the present disclosure all of the analytics that prioritize or filter a user's messages (e.g., to allow the user to know what messages should be addressed first or are most important, etc.) can be performed at the universal collaborative messaging system server and not on the client or in the mobile application. This approach can offer the added benefit of allowing for further refinement of the messaging system overall in addition to the ability to change sensitivity or access dynamically.

It is an aspect of the present disclosure to eliminate the need for specialized email, voicemail, IM, SMS, multimedia messaging service (MMS), or messaging and chat clients. Additionally or alternatively, the present disclosure is different from client-oriented messaging models insofar as the universal collaborative messaging system leverages more dynamic analytics while simplifying the base access to less-sensitive or non-sensitive messages and while providing greater security and control of sensitive messages.

It should be appreciated that aspects of the present disclosure, including the file systems disclosed herein, are not inherently scale limited for this idea to work. Every user may have their own directory branch. Any collection of users can be grouped on one storage implementation as a mount point. The present disclosure can provide quick scalability, and since the universal collaborative messaging system is file system oriented, the system is compatible with storage area network (SAN) and other network endpoints.

In some embodiments, the universal collaborative messaging system and methods disclosed herein are operable to change messages into folders and/or files that have a secure central repository. An analytic service of the universal collaborative messaging system can create a filename and apply DRAM while providing flexible security. Among other things, the universal collaborative messaging system solves a continued headache of disparate message client development while providing an interesting new secure messaging implementation.

Embodiments include a server, comprising: a processor, a memory, and a universal collaborative messaging system (UCMS) application contained in the memory and executed by the processor, the UCMS application configured to receive messages from a plurality of different messaging sources, wherein the messages are configured as communications from a sender to at least one recipient including a user, transform a received message from a first messaging format into a second messaging format, wherein the second messaging format is configured as at least one of a file and folder compatible with a standardized file management system, store the transformed message in the second messaging format in a secure central memory in communication with the server, and send a notification to a communication device of the user, wherein the notification activates a universal message viewing application on the communication device and causes at least a portion of the transformed message to display on the communication device and enables a connection to the secure central memory via the communication device and the server. An aspect of the above server includes wherein the UCMS application is further configured to determine a first messaging format of the message, extracting, based on the identification of the first messaging format, content of the message, wherein the content includes one or more portions of the message, and automatically build the transformed message using only the extracted content of the message. An aspect of the above server include wherein the secure central memory includes at least one cloud storage platform administered by a third party, and wherein the cloud storage platform is configured with the standardized file management system and a synchronized directory configured to synchronize the transformed message with the communication device and other authorized client communication devices.

Embodiments include a method, comprising: providing a universal message viewing application to a user for installation on a communication device of the user; receiving, at a server, messages from a plurality of different messaging sources, wherein the messages are configured as communications from a sender to at least one recipient including the user; transforming, by the server, a received message from a first messaging format into a second messaging format, wherein the second messaging format is configured as at least one of a file and folder compatible with a standardized file management system; storing the transformed message in the second messaging format in a memory associated with the server and the user; and sending, by the server, a notification to the communication device of the user, wherein the notification activates the universal message viewing application and causes at least a portion of the transformed message to display on the communication device and enables a connection to the memory via the communication device and the server. An aspect of the above method include wherein transforming the message received further comprises: determining, via the server, a first messaging format of the message; and extracting, based on the identification of the first messaging format, content of the message, wherein the content includes one or more portions of the message. An aspect of the above method further comprises: building, automatically via the server, the transformed message using only the extracted content of the message. An aspect of the above method includes wherein the content of the message includes information stored in two or more of a header, footer, body, and metadata of the message. An aspect of the above method further comprises: determining whether the message includes a text portion and an attachment; building the transformed message as the folder when the message includes the text portion and an attachment; and building the transformed message as the file when the message does not include both of the text portion and the attachment. An aspect of the above method further comprises: determining whether the message is an initial message or a subsequent message between the sender and the user, wherein the subsequent message corresponds to an additional message associated with a previous communication between the sender and the user, and wherein the previous communication includes at least one file and folder stored in the memory as a group; building the transformed message as a first file or first folder for storing in the memory when the message is determined to be the initial message between the sender and the user; and building the transformed message as a subsequent file or subsequent folder for storing in the group when the message is determined to be the subsequent message between the sender and the user. An aspect of the above method further comprises: generating, via the server, a name for the transformed message, wherein the name includes at least a portion of the content extracted from the message. An aspect of the above method includes wherein a single instance of the transformed message is stored in the memory, and wherein a pointer file including a link to the single instance of the transformed message is stored in a file management group associated with the user and any other user included as a recipient of the message. An aspect of the above method further comprises: determining a sensitivity associated with the message, wherein the sensitivity is configured to identify one or more of a restricted access, recipient, and distribution, and wherein the sensitivity is associated with a low, medium, or high value. An aspect of the above method includes wherein the sensitivity of the transformed message is changed in response to automatically determining, by the server, that a sensitivity for a related message to the transformed message has changed. An aspect of the above method includes wherein the memory associated with the server is different for messages having a low value of sensitivity and messages having a high value of sensitivity. An aspect of the above method includes wherein the server applies digital rights access management (DRAM) to messages that are transformed from received messages having the high value of sensitivity. An aspect of the above method includes wherein the notification sent to the communication device of the user requires a real-time communication connection for the communication device to access the memory for transformed messages having DRAM.

Embodiments include a non-transitory computer readable medium having stored thereon instructions that, when executed by a processor, perform a method comprising: receiving, at a server, messages from a plurality of different messaging sources, wherein the messages are configured as communications from a sender to at least one recipient including the user; transforming, by the server, a received message from a first messaging format into a second messaging format, wherein the second messaging format is configured as at least one of a file and folder compatible with a standardized file management system; storing the transformed message in the second messaging format in a memory associated with the server and the user; and sending, by the server, a notification to a communication device of the user, wherein the notification activates a universal message viewing application on the communication device and causes at least a portion of the transformed message to display on the communication device and enables a connection to the memory via the communication device and the server. An aspect of the above non-transitory computer readable medium include. An aspect of the above non-transitory computer readable medium include wherein the method further comprises: determining, via the server, a first messaging format of the message; and extracting, based on the identification of the first messaging format, content of the message, wherein the content includes one or more portions of the message. An aspect of the above non-transitory computer readable medium include wherein the method further comprises: building, automatically via the server, the transformed message using only the extracted content of the message. An aspect of the above non-transitory computer readable medium include wherein prior to receiving the at least one message, the method further comprises: registering the server as a messaging client of the user with each of the plurality of different messaging sources.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising," "including," and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

The term "computer-readable medium" as used herein refers to any tangible storage that participates in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, or any other medium from which a computer can read. When the computer-readable media is configured as a database, it is to be understood that the database may be any type of database, such as relational, hierarchical, object-oriented, and/or the like. Accordingly, the disclosure is considered to include a tangible storage medium and prior art-recognized equivalents and successor media, in which the software implementations of the present disclosure are stored.

The terms "determine," "calculate," and "compute," and variations thereof, as used herein, are used interchangeably and include any type of methodology, process, mathematical operation or technique.

The term "module" as used herein refers to any known or later developed hardware, software, firmware, artificial intelligence, fuzzy logic, or combination of hardware and software that is capable of performing the functionality associated with that element. Also, while the disclosure is described in terms of exemplary embodiments, it should be appreciated that individual aspects of the disclosure can be separately claimed.

BRIEF DESCRIPTION OF THE DRAWINGS

The present disclosure is described in conjunction with the appended figures.

DETAILED DESCRIPTION

The ensuing description provides embodiments only, and is not intended to limit the scope, applicability, or configuration of the claims. Rather, the ensuing description will provide those skilled in the art with an enabling description for implementing the embodiments. It being understood that various changes may be made in the function and arrangement of elements without departing from the spirit and scope of the appended claims.

Figure 1:
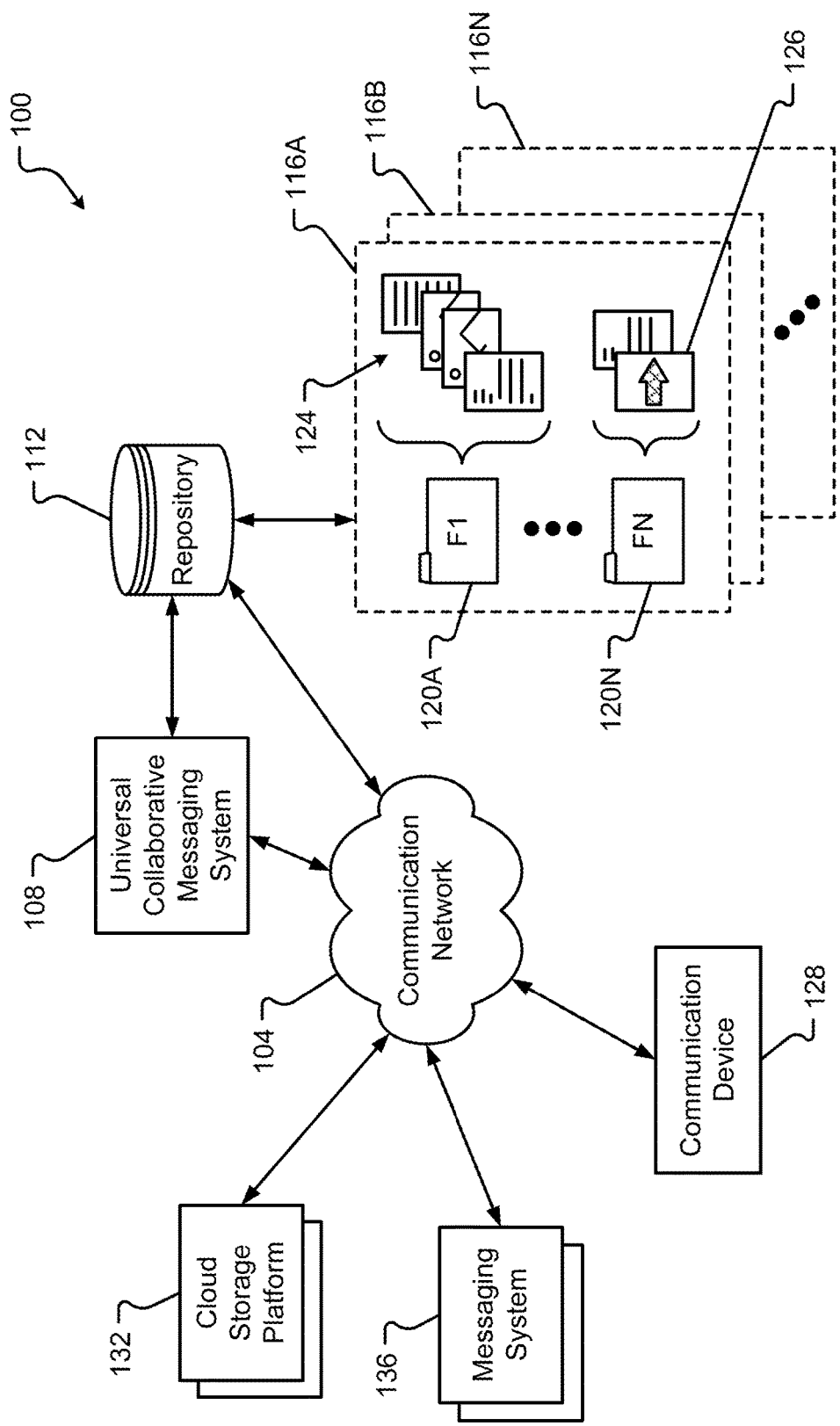
FIG. 1 is a block diagram of a universal collaborative communication system in accordance with embodiments of the present disclosure.

FIG. 1 shows an illustrative embodiment of a universal collaborative communication system 100 in accordance with at least some embodiments of the present disclosure. The universal collaborative communication system 100 may comprise a communication network 104 connecting one or more messaging systems 136, cloud storage platforms 132, communication devices 128 with a universal collaborative messaging system (UCMS) server 108. In some embodiments, the UCMS server 108 may include a repository 112 or other secure data storage memory. In one embodiment, the UCMS server 108 may utilize at least one of the cloud storage platforms 132 as the repository 112. In any event, the repository 112 may be configured to store one or more folders 120, files 124, file pointers 126, and/or combinations thereof, in at least one file group 116. In some embodiments, the UCMS server 108 may be owned and operated by an enterprise administering a messaging system in which a plurality of communication devices 128 are connected for sending and receiving messages.

In accordance with at least some embodiments of the present disclosure, the communication network 104 may comprise any type of known communication medium or collection of communication media and may use any type of protocols to transport messages between endpoints. The communication network 104 may include wired and/or wireless communication technologies. The Internet is an example of the communication network 104 that constitutes an Internet Protocol (IP) network consisting of many computers, computing networks, and other communication devices located all over the world, which are connected through many telephone systems and other means. Other examples of the communication network 104 include, without limitation, a standard Plain Old Telephone System (POTS), an Integrated Services Digital Network (ISDN), the Public Switched Telephone Network (PSTN), a Local Area Network (LAN), a Wide Area Network (WAN), a Session Initiation Protocol (SIP) network, a Voice over Internet Protocol (VoIP) network, a cellular network, and any other type of packet-switched or circuit-switched network known in the art. In addition, it can be appreciated that the communication network 104 need not be limited to any one network type, and instead may be comprised of a number of different networks and/or network types. Moreover, the communication network 104 may comprise a number of different communication media such as coaxial cable, copper cable/wire, fiber-optic cable, antennas for transmitting/receiving wireless messages, and combinations thereof.

The communication device 128 may correspond to at least one of a smart phone, tablet, personal computer, and/or some other computing device. Each communication device 128 may be configured with an OS and at least one communication application. The communication application may be configured to exchange communications between the communication device 128 and another entity (e.g., a UCMS server 108, a cloud storage platform 132, etc.) across the communication network 104. Additionally or alternatively, communications may be sent and/or received via the communication device 128 as a telephone call, a packet or collection of packets (e.g., IP packets transmitted over an IP network), an email message, an IM, an SMS message, an MMS message, a chat, and/or combinations thereof. In some embodiments, the communication device 128 may be associated with a particular user in the communication system 100.

The cloud storage platform 132 may correspond to one or more file hosting service, database, cloud storage and memory, and/or other network accessible data storage platform. In some embodiments, the cloud storage platform 132 may provide services including, but not limited to, one or more of data storage, data management, file management, access controls, user association, application programming interfaces, file synchronization between the cloud storage and one or more clients, client software, and other file and folder management systems. The cloud storage platform 132 may include free, paid-for, public, open-source, and/or private data storage systems. As provided above, examples of cloud storage platforms 132 may include, but are in no way limited to, the cloud storage memory, services, and features managed and offered by companies like Box, Dropbox, Drive, iCloud, OneDrive, etc. It is an aspect of the present disclosure that the UCMS server 108 may utilize the services offered by one or more cloud storage platforms 132 to act as a central repository or data storage location for one or more of the translated or transformed messages disclosed herein.

The messaging system 136 may correspond to one or more messaging service and/or system configured to enable and/or provide communications, or messages, between users in a communication environment. These communications may include text messages, emails, short message service (SMS) messages, chats, instant messages, and/or the like. In some embodiments, the messaging system 136 may include a plurality of different messaging systems, protocols, message types, service providers, proprietary software requirements, and the like. Non-limiting examples of messaging systems 136 may include text messaging services, email services, instant messaging services, real-time communication services, chat services, and the like. The messaging systems 136 may include one or more servers distributed across a communication network 104.

In some embodiments, the UCMS server 108 may be configured to receive messages from one or more messaging systems 136 and translate or otherwise transform the messages into one or more folders 120A-N and files 124. These files 124 and folders 120A-N may be stored in a central repository 112. In one embodiment, the UCMS server 108 may utilize one or more cloud storage platform 132 to act as the central repository 112. Although the folders 120A-N may include one or more files 124, it should be appreciated that one or more files 124 may be stored alone, or separate, (e.g., as stand-alone translated messages, etc.) from one or more folders 120A-N in the repository 112. The files 124 stored in the repository 112 may correspond to at least one of text files, image files, html files, pointers 126, and/or other data files, etc. In some embodiments, these files 124 may include one or more of the text of a message, a summary of the message, an attachment of a message, message information (e.g., headers, payload, footers, transmission data, timing, etc.), metadata information, other content associated with the message, etc., and/or combinations thereof.

In some embodiments, folders 120A-N or files 124 may be associated with a particular user, group of users, organized by topic and/or subject, and the like. These translated message groups 116A-N are shown as including one or more files 124 and folders 120A-N. In some embodiments, a translated message may be associated with a particular sensitivity and stored in a "sensitive" translated message group 116. In one embodiment, the UCMS server 108 may determine to store a single instance of a translated message, or portion thereof, in the repository 112. Among other things, this storage approach can save significant storage space, improve the speed and reliability of file/folder management, reduce maintenance of the file system, and increase security of certain translated messages. Additionally or alternatively, eliminating the storage redundancies in the communication system may require the use of pointers 126 from one group 116A to another group 116B. In any event, the pointers 126 may be saved in a file 124 or folder 120 format. When accessed by a communication device 128 seeking a particular file 124 or folder 120, the pointer 126 directs the communication device 128 to a location, or locations, in the repository where the destination of the particular file 124 or folder 120 can be found and retrieved or accessed.

The use of pointers 126 in the system can increase security by allowing the selective control of access to a file by one or more users. For example, a first user may have access to a message where sensitive payroll data of an organization is being discussed between company executives. This access may be provided by including a pointer 126 file to the message, the pointer 126 stored in the first user's group 116A of associated files 124 and folders 120. However, the actual message may reside in a location elsewhere in the repository (e.g., another group 116B). In the event that the first user's access rights change or if the message is marked as "sensitive" the pointer 126 available to the first user may become nonfunctional. For instance, the pointer 126 may include a sensitivity or access portion that must match the sensitivity or access portion associated with the destination location of the message before access is granted. Additionally or alternatively, one or more pointers 126 may be selectively altered or removed from groups associated with users based on policy and/or administrative settings. In one embodiment, the pointer 126 may include a time-to-live value that allows for unrestricted access by a communication device 128 during the time specified by the time-to-live value. This time-to-live value may be updated, renewed, or otherwise altered automatically, based on policy, administrative setting, combinations thereof, or the like.

Figure 2:
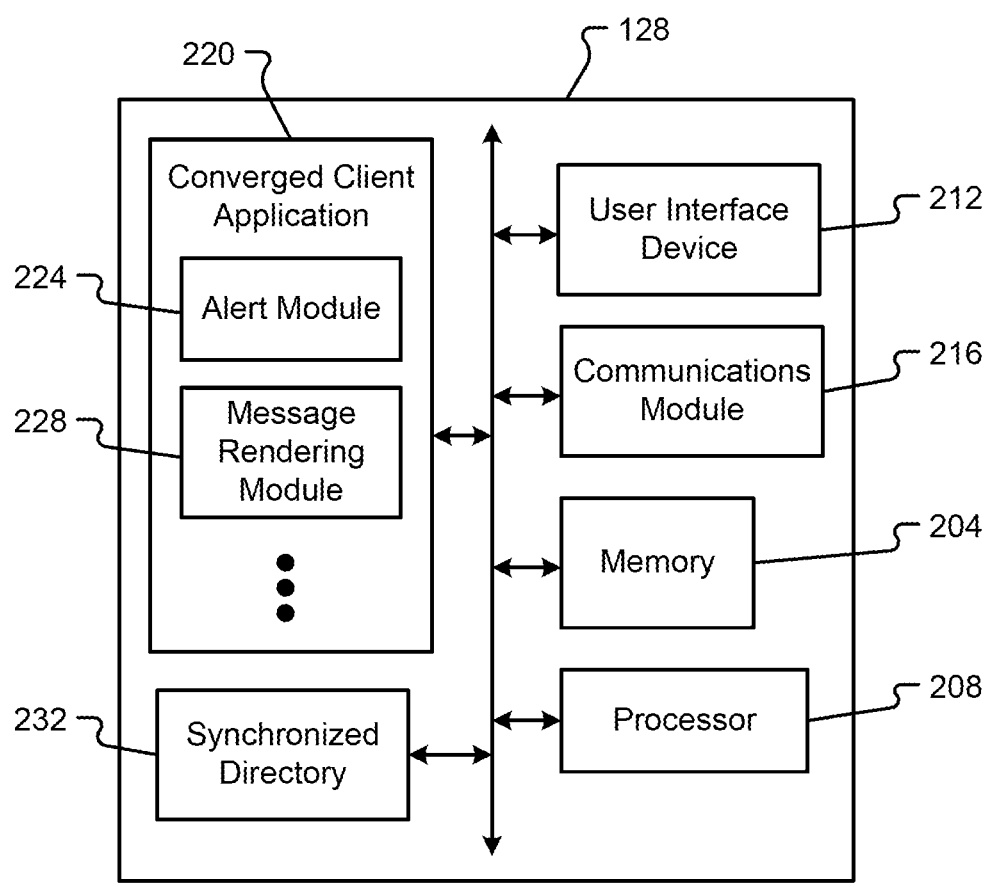
FIG. 2 is a block diagram depicting a communication device or components thereof in accordance with embodiments of the present disclosure.

Referring now to FIG. 2 a block diagram depicting a communication device 128 or components thereof in accordance with embodiments of the present disclosure. The communication device 128 may include a memory 204, a processor 208, a user interface device 212, a communications module 216, a converged client application 220, and a synchronized directory 232. The processor 208 may be an application specific integrated circuit (ASIC), microprocessor, programmable controller, or the like. In some embodiments, the processor 208 may include programming that when executed converts the processor 208 into a specially-configured.

The memory 204 of the communication device 128 may be used in connection with the execution of application programming or instructions by the processor 208, and for the temporary or long term storage of program instructions and/or data. The memory 204 may contain executable functions that are used by the processor 208 to run other components of the communication device 128. In one embodiment, the memory 204 may be configured to store user identification and/or message access information. For instance, this information may include, but is not limited to, unique identifications, device or component manufacturer identification, passwords, enterprise-configured security levels, sensitivity access, and the like. As examples, the memory 204 may comprise random access memory (RAM), dynamic random access memory, synchronous dynamic random access memory (SDRAM), or other solid state memory.

The processor 208 may comprise a programmable processor or controller for executing application programming or instructions. In accordance with at least some embodiments, the processor 208 may include multiple processor cores, and/or implement multiple virtual processors. In accordance with still other embodiments, the processor 208 may include multiple physical processors. As a particular example, the processor 208 may comprise a specially configured application specific integrated circuit (ASIC) or other integrated circuit, a digital signal processor, a controller, a hardwired electronic or logic circuit, a programmable logic device or gate array, a special purpose computer, or the like. The processor 208 generally functions to run programming code or instructions implementing various functions of the communication device 128.

Embodiments of the present disclosure can include a user interface device 212. The user interface device 212 may be a graphical user interface or display device. In some embodiments, the user interface device 212 may correspond to a touch screen of the communication device 128. The user interface device 212 may be configured to present a user with various options regarding access to, organization of, navigation of, and/or other management associated with one or more of the messages disclosed herein. For example, when a user provides an input via the user interface device 212 corresponding to at least one of the various options, the converged client application 220 or other applications run via the communication device 128 may proceed to execute instructions in accordance with the selected option(s).

The communications module 216 of the communication device 128 can include a cellular telephony module, wireless communications module, or other additional or alternative communications modules in support of communications functions or capabilities. As examples, the cellular telephony module can comprise a GSM, CDMA, FDMA and/or analog cellular telephony transceiver capable of supporting voice, multimedia and/or data transfers over a cellular network. The wireless communications module may comprise a Wi-Fi, Bluetooth®, WiMax, infrared, or other wireless communications link. The cellular telephony module and the wireless communications module can each be associated with a shared or a dedicated antenna of the communication device 128.

In some embodiments, the communication device 128 may include a converged client application 220. The converged client application 128 may include one or more instructions that when executed by the processor 208 provides a connection to one or more of the UCMS server 108 and repository 112 disclosed. The connection may include exchanging communications between the communication device 128 and the UCMS server 108, viewing one or more files and folders managed by the UCMS server 108 and stored in a repository 112, rendering an application run via the UCMS server 108, providing a client portal or other electronic gateway to a one or more files, applications, services, etc. on the UCMS server 108, and/or providing some other type of access to one or more features of the UCMS server 108. In some embodiments, the communication device 128 may utilize an OS file management system, or other file management system that is associated with or installed on the communication device 128.

The converged client application 220 may utilize an alert module 224, a message rendering module 228, a synchronized directory 232, and/or other modules or memory. In some embodiments, the alert module 224 may be configured to provide an alert to a user regarding a message associated with the UCMS server 108. This alert may be provided via the user interface device 212, speaker, vibration motor, lighting element, or other alert device associated with the communication device 128. The message rendering module 228 may be configured to render a message (e.g., a message translated by the UCMS server 108, etc.) to the user interface device 212 or other graphical user interface of the communication device 128.

In some embodiments, the UCMS server 108 may communicate across a communication network 104 with a synchronized directory 232 stored on a communication device 128. The UCMS server 108 may include a directory synchronization service module 332 that enables the synchronization of select data between the UCMS server 108, and/or the repository 112, and a communication device 128. For instance, the synchronization directory 232 may include a synchronized hierarchical folder structure comprising a number of files and folders representing messages translated or transformed from a plurality of different messaging systems 136 and sources. In some embodiments, the synchronized directory 232 may be represented as a list, tree view, graphical icons, dependency charts, and/or the like. Additionally or alternatively, the message rendering module 228 of the communication device 128 may be configured to render an image, or set of images, representing the synchronized directory 232 to a graphical user interface or user interface device 212 of the communication device 128.

Figure 3:
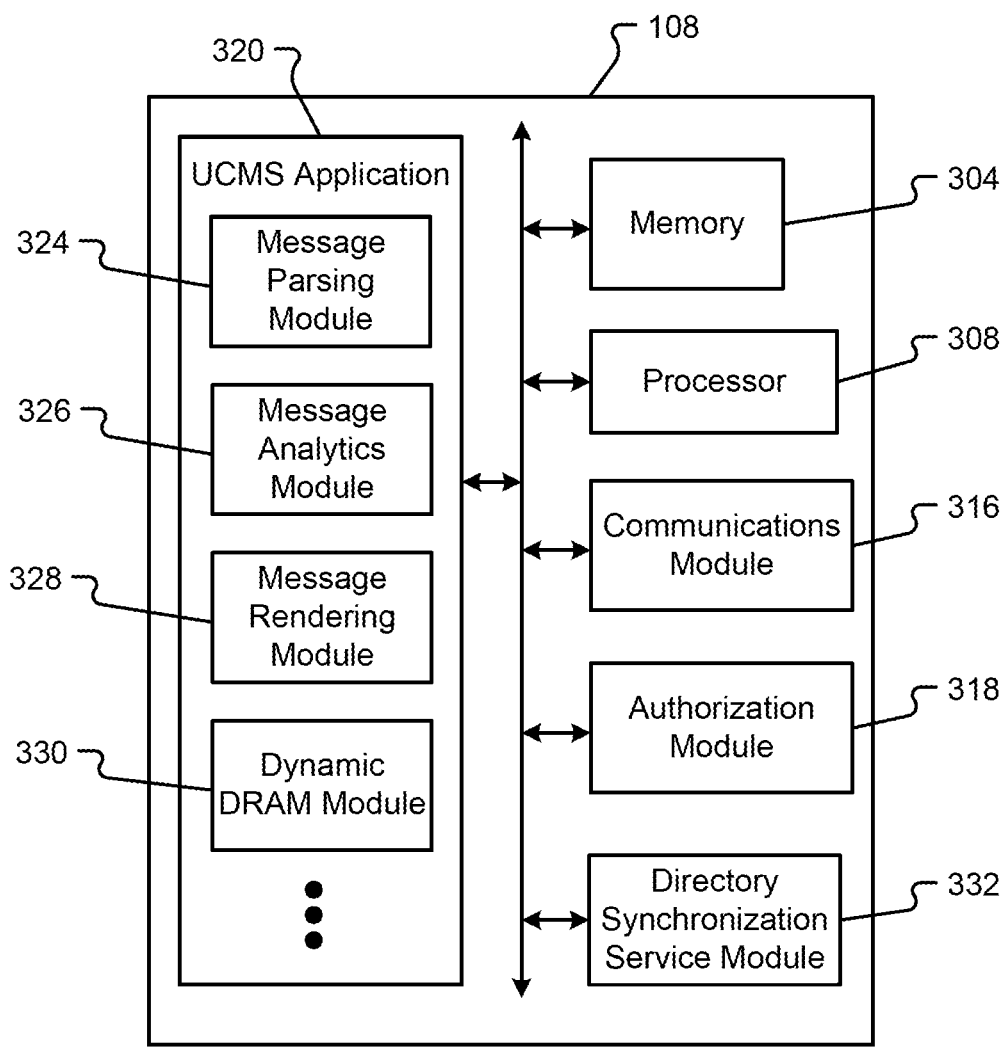
FIG. 3 is a block diagram depicting a universal collaborative messaging system server or components thereof in accordance with embodiments of the present disclosure.

FIG. 3 shows a block diagram depicting a UCMS server 108 or components thereof in accordance with embodiments of the present disclosure. The UCMS server 108 may include a memory 304, processor 308, communications module 316, authorization module 318, directory synchronization service module 332, and a UCMS application 320.

The memory 304 of the UCMS server 108 may be used in connection with the execution of application programming or instructions by the processor 308, and for the temporary or long term storage of program instructions and/or data. The memory 304 may contain executable functions that are used by the processor 308 to run other components of the UCMS server 108. In one embodiment, the memory 304 may be configured to store policy information, enterprise settings, and/or other information. As examples, the memory 304 may comprise RAM, dynamic random access memory, SDRAM, or other solid state memory.

The processor 308 may comprise a programmable processor or controller for executing application programming or instructions. In accordance with at least some embodiments, the processor 308 may include multiple processor cores, and/or implement multiple virtual processors. In accordance with still other embodiments, the processor 308 may include multiple physical processors. As a particular example, the processor 308 may comprise a specially configured application specific integrated circuit (ASIC) or other integrated circuit, a digital signal processor, a controller, a hardwired electronic or logic circuit, a programmable logic device or gate array, a special purpose computer, or the like. The processor 308 generally functions to run programming code or instructions implementing various functions of the UCMS server 108.

The communications module 316 of the UCMS server 108 may include any known communications components configured to support of communications between one or more devices in the communication system 100. It should be appreciated that the communications module 316 may be configured to communicate via one or more links between elements of the communication system 100. These various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

The authorization module 318 may include user identification and/or message access information. This information may include, but is not limited to, unique identifications of users, device or component manufacturer identifications, passwords, enterprise-configured security levels, sensitivity access controls, and the like. In some embodiments, the authorization module 318 may be configured to selectively control access to one or more features of the UCMS server 108 and data in the repository 112.

In some embodiments, UCMS server 108 may include a UCMS application 320. In some cases, the UCMS application 320 may include a message parsing module 324, a message analytics module 326, a message rendering module 328, a dynamic DRAM Module 330, and more. The UCMS application 320 may be configured to communicate with one or more of repositories 112, communication devices 128, cloud storage platforms 132, messaging systems 136, and other elements in the communication system 100. In some embodiments, the UCMS application 320 may be configured to receive messages from a plurality of messaging systems 136, translate, convert, or otherwise transform the messages into files, and store the translated messages (e.g., files, etc.)

in a central repository 112. It is an aspect of the present disclosure that the UCMS server 108 may be registered with one or more of the messaging systems 136 and cloud storage platforms 132 using, for example, user-specific information stored in the authorization module 318 or other memory of the UCMS server 108.

In one embodiment, the messaging parsing module 324 of the UCMS server 108 may be configured to receive and parse the messages provided by one or more messaging systems 136 (e.g., associated with one or more users, etc.). Upon receiving a message, the messaging parsing module 324 determines a format of the message and may be configured to analyze the message for any metadata. Using this information, the messaging parsing module 324 can convert the received message into a file or folder having attachments represented as individual files as well as any text portion of the message in one or more files (e.g., in the message folder, etc.). Next, the messaging parsing module 324 may be configured to name the file and/or folder with message content and/or metadata. For instance, the name may include one or more of the originator of the message, content of the message, and/or other information that makes the message easily recognizable in a file management system. The messaging parsing module 324 may store the translated message (e.g., the files and/or folders, etc.) in the repository 112, or other cloud storage platform 132, etc.

The message analytics module 326 may be configured to run analytics on each of the translated messages stored in the repository 112 or other memory. The analytics may prioritize messages in the repository 112 based on an importance of the message to a user, a sensitivity of the message, an encryption associated with the message, and may even render an analytic of personal behavior or context.

In some embodiments, the message rendering module 328 may be configured to render a translated message in a file system, on a communication device 128, or in some other element of the communication system 100. In one embodiment, the message rendering module 328 may render one or more translated messages to a graphical user interface or display associated with the UCMS server 108.

The dynamic DRAM module 330 may be configured to apply digital rights access management to one or more of the translated messages. In some embodiments, the functionality of the dynamic DRAM module 330 may be included in the message analytics module 326. In one embodiment, the message analytics module 326 may include the dynamic DRAM module 330. It is an aspect of the present disclosure that the dynamic DRAM module 330 may be configured to selectively apply DRAM to messages based at least partially on the sensitivity of the content in a message. Additionally or alternatively, the dynamic DRAM module 330 may be configured to selectively apply DRAM to messages based at least partially on which users are permitted, or authorized, to read or delete the message.

The UCMS server 108 may include a directory synchronization service module 332 that is configured to propagate select data stored in the repository 112 or other cloud storage platform 132 to one or more communication devices 128 in the communication system 100. In some embodiments, the directory synchronization service module 332 may be restricted from synchronizing sensitive messages (e.g., messages identified as sensitive, restricted, or otherwise marked for secure storage, etc.) to an end-user device or communication device 128. In one embodiment, the directory synchronization service module 332 may synchronize translated messages (e.g., in the form of a file directory, etc.) to valid communication devices 128 as may be controlled or otherwise authorized via information in the authorization module 318.

Figure 4:
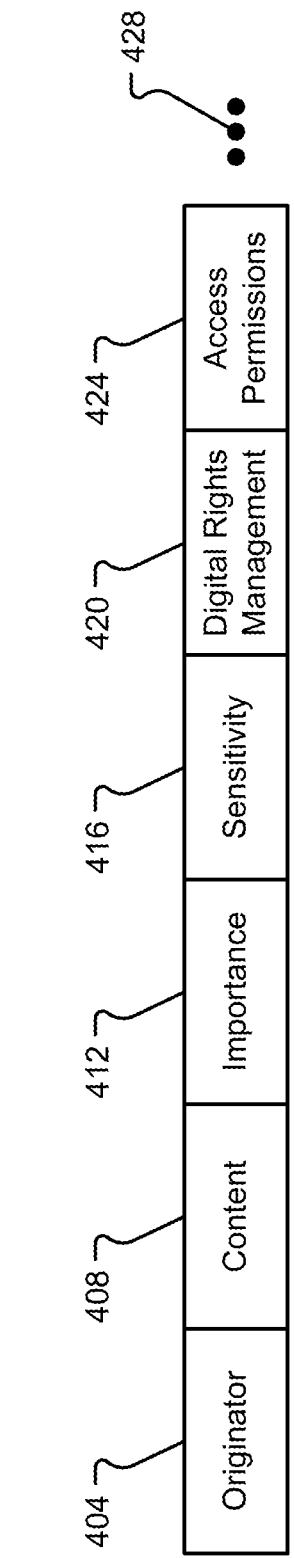
FIG. 4 is a block diagram depicting a translated message data structure used in accordance with embodiments of the present disclosure.

FIG. 4 is a block diagram depicting a translated message data structure 400 used in accordance with embodiments of the present disclosure. Specifically, the UCMS server 108 may be configured to convert each message into a file or folder having a corresponding data structure 400 which identifies the originator of the message in an originator information field 404, provides content associated with the message in a content information field 408, identifies the importance of the message in an importance information field 412, identifies at least one sensitivity associated with the message in a sensitivity information field 416, identifies digital rights access management associated with the message in a DRAM information field 420, includes access control and permission data in an access permissions data field 424, and more 428.

The originator information field 404 may comprise data that identifies an originator of the message. In some embodiments, the UCMS server 108 may use information associated with a received message to populate the originator information field 404 of the data structure 400. In one embodiment, this information may be assembled from one or more header, body, footer, and/or envelope of a received message. For example, a first message header may include a "From" field, while a second message header may include a "To" field. In this example, the "From" header may identify a sender of the message, and the "To" header may identify at least one recipient of the message. It should be appreciated that the originator of the message may refer to the sender of the message at a particular time. In one example, the originator of the message may refer to the first sending party of a message. In another example, the originator of the message may correspond to the sender of a particular message in a message string, or conversation having multiple messages. In any event, the originator of the message may be identified in the originator information field 404 by one or more of a name, an address, a symbol, a number, a letter, a character, and combinations thereof.

In some embodiments, this field 404 may be used by the UCMS server 108 in organizing a translated message, or file, in a file management system of a repository 112. It is an aspect of the present disclosure that the files and/or folders in the repository 112 may be organized, arranged, or otherwise managed based on one or more fields of the data structure 400 described herein. By way of example, translated message files representing the original messages received may be categorized or grouped by the originator of the received messages. Additionally or alternatively, the individual fields of the data structure 400 may be used alone, or in combination, by the UCMS server 108 in applying analytics. The analytics may be used to determine priorities, user behavior, and/or other information associated with messaging and a user. Among other things, the originator information field 404 may comprise data that can be used to differentiate between various messages received by the UCMS server 108.

The content information field 408 may comprise data that identifies at least some content contained within the message received by the UCMS server 108. The content may be assembled by the UCMS server 108 analyzing various portions of the received message. In some embodiments, the content may correspond to data contained within the body or payload of a message, metadata of the message, a header of the message, and/or a footer of the message. In one embodiment, the information stored in the content information field 408 may represent a summary or an abbreviated representation of the content associated with the received message. As can be appreciated, the content may include, but is in no way limited to, text, codes, instructions, images, videos, animations, etc., and/or combinations thereof. In some embodiments, the content information may be assembled from one or more header, body, footer, and/or envelope of a received message. For example, a first message header may include a "Subject" field, while a second message header may include a "Content-Type" field. In this example, the "Subject" header may identify a topic or subject associated with the message, and the "Content-Type" header may identify the type of content included in the message. Similar, to the other fields of the data structure, the files and/or folders in the repository 112 may be organized, arranged, or otherwise managed based on the content information field of the data structure 400. For instance, translated message files representing the original messages received may be categorized or grouped by the content of the received messages as contained within the content information field 408.

The importance information field 412 may include a rank or rating value of a particular message, or group of messages, based on one or more factors analyzed by the UCMS server 108. Examples of these factors may include, but are not limited to, an urgency indication associated with the original message, a relative importance to a user based on the originator of the message or other parties included in the distribution of the message (e.g., identified in the originator information field 404, message header, etc.), a topic or subject of the message, an access permission of the message, and the like. The data in the importance information field 412 may dynamically change over time. For instance, initial communications with third party may be considered of little importance to a user. In this example, the UCMS server 108 may identify the translated message as "low" importance (e.g., using a ranking value system from low to medium, to high levels of importance, etc.) in the importance information field 412. As time passes, the UCMS server 108 may determine (e.g., using analytics, etc.) that the frequency of communications or messaging between the user and the third party is increasing. Additionally or alternatively, based on the content of the messages exchanged, the UCMS server 108 may determine that the messages include keywords, content, or other information, indicating that the messages are important to the user. In one embodiment, the UCMS server 108 may determine that the user opens or accesses messages sent by the third party faster than the user opens or accesses messages sent by others. In any event, the UCMS server 108 may analyze these factors and determine to alter the information in the importance information field 412. One example of altering the information may include elevating the importance value in the field 412 to a "medium" or "high" level of importance. As can be appreciated, the UCMS server 108 may determine to lower a "medium" or "high" level of importance to a lower value when the UCMS server 108 determines that the importance of the message to a user has decreased in value (e.g., the user deletes the messages upon receipt, fails to check the message for a period of time, moves the message to a particular folder, etc.).

The sensitivity information field 416 may include information identifying whether a message is associated with content, access, or distribution restrictions. Depending on the type of sensitivity associated with a message, the sensitivity information field 416 may include information used by the UCMS server 108 to alert a recipient of the message about the sensitivity, store the translated message in a secure or unsecure central storage location, restrict access to the translated message via a particular connection (e.g., WebRTC, etc.), restrict access to at least one authorized party, prevent copying of the translated message, and/or otherwise manage the translated message. The sensitivity of message may be defined or set by policy, by a message originator, by an administrator, by the UCMS server 108, and/or dynamically based on changing conditions associated with the message or message context. Additionally or alternatively, the data in the sensitivity information field 416 may dynamically change over time.

The DRAM information field 420 may include digital rights access management information associated with a translated message. In some embodiments, the UCMS server 108 may determine to apply DRAM to a translated message based on the sensitivity information contained in the sensitivity information field 416 of the data structure 400. For instance, DRAM may be selectively applied to messages based at least partially on which users are permitted, or authorized, to read or delete the message. In any event, the data in the DRAM information field 420 may dynamically change over time. In one embodiment, where a translated message previously identified as "non-sensitive" (e.g., and having no DRAM assigned thereto) is determined to change in sensitivity (e.g., changing from to "sensitive," "highly sensitive," etc.) the UCMS server 108 may determine to apply DRAM to the translated message. The DRAM information in this instance may be maintained in the DRAM information field 420. As can be appreciated, users that do not have the requisite DRAM authorization for the particular translated message may be prevented from accessing, viewing, distributing, or otherwise interacting with the translated message.

The access permissions data field 424 may correspond to authorization information for accessing a particular translated message. Similar to the DRAM information field 420, the access permissions data field 424 may include information used by a UCMS server 108 in allowing or restricting access to a particular translated message. In some embodiments, the access permissions data field 424 may include authorization requirements, approved user identification lists (e.g., whitelists, etc.), disallowed user identification lists (e.g., blacklists, etc.), and/or other authorization information. The data in the access permissions data field 424 may dynamically change over time based on message conditions, administrative settings, policies, and/or the like.

Figure 5:
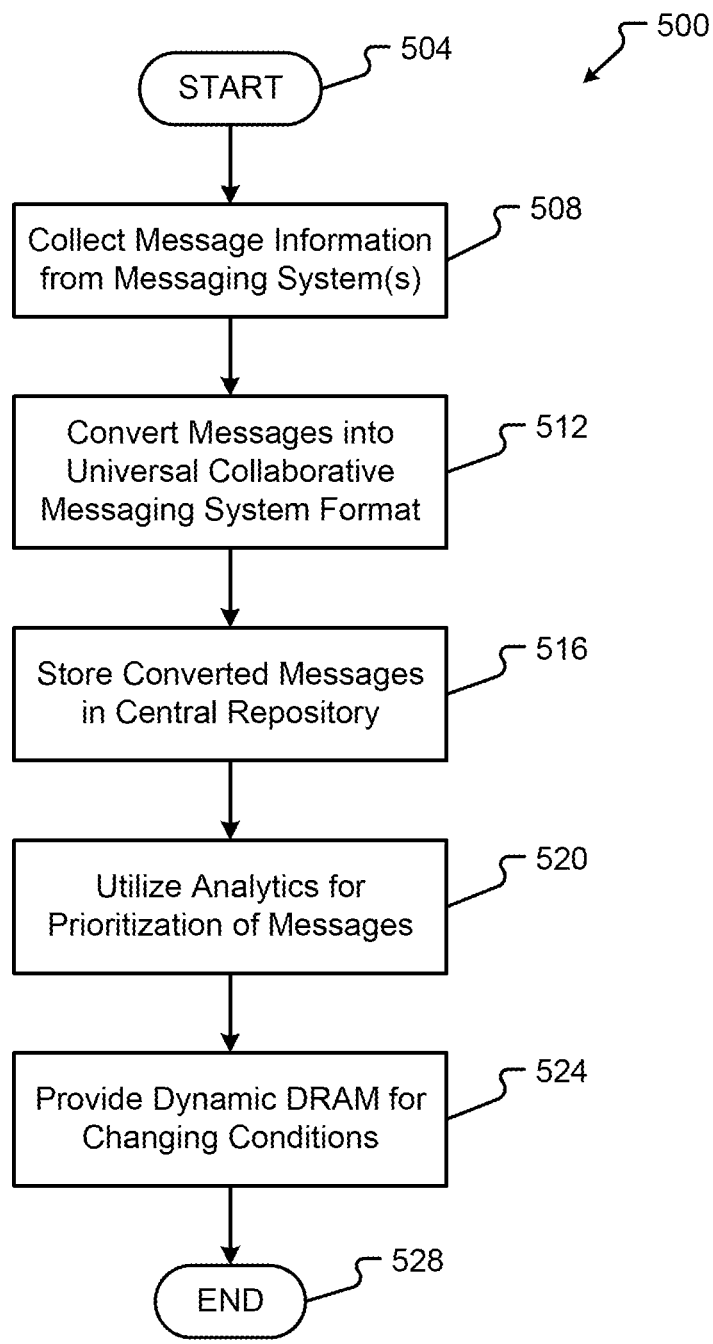
FIG. 5 is a flow diagram depicting a method of converting messages into a universal collaborative messaging system format in accordance with embodiments of the present disclosure.

FIG. 5 is a flow diagram depicting a method 500 of converting messages into a universal collaborative messaging system format in accordance with embodiments of the present disclosure. While a general order for the steps of the method 500 is shown in FIG. 5, the method 500 can include more or fewer steps or can arrange the order of the steps differently than those shown in FIG. 5. Generally, the method 500 starts with a start operation 504 and ends with an end operation 528. The method 500 can be executed as a set of computer-executable instructions executed by a computer system and encoded or stored on a computer readable medium. Hereinafter, the method 500 shall be explained with reference to the systems, components, modules, mechanisms, software, data structures, etc., described in conjunction with FIGS. 1-4.

The method 500 begins at step 504 and proceeds by collecting message information from one or more messaging systems 136 (step 508). In some embodiments, the messages are automatically collected by the UCMS server 108 as described herein. For instance, a user may register authorization information associated with a particular messaging system 136 with the UCMS server 108. In one embodiment, the authorization information may include the user's username, password, and/or other unique identification information. Once registered, the UCMS server 108 can then act as a client and passively receive the messages sent by the registered messaging system 136.

Next, the method 500 continues by converting the received messages into a UCMS format (step 512). The UCMS format may include a format that can be interpreted, organized, and managed by a file management system configured to manage data files in a computer system. Examples of a UCMS format may include one or more files, folders, pointers, and the like. Converting, or translating, the message may include stripping the received message of proprietary formatting and information, extracting metadata, and creating a file or folder to represent the received message in a simplified format. This simplified format may be configured to be managed by a plurality of standard file management systems, such as the file management systems used in various computer OS's.

By way of example, a first user may send a message to a second user via a first proprietary messaging service having a proprietary format and communication application. The UCMS server 108 may receive this message, determine the format specific to the first proprietary messaging service if any, and then decode the message using application programming interfaces or instructions configured for the first proprietary messaging service. The UCMS server 108 may then generate a message file or folder based on the information in the received message.

For instance, the message received may be a single text message stating to the second user "I am going to Alice's party," the UCMS server 108 may determine to generate a standard file (e.g., in the form of a text file: ".txt," ".csv," a web file ".html," etc.) to represent the received message such that a file management system can manage the standard file. In one embodiment, the filename of the standard file may include all of the pertinent information required to be interpreted or managed. For example, the filename may at least include the sender information, content information, and even a time the message was transmitted. Continuing the example above, the file may be stored having the name "FirstUser_Going_to_Alice_Party."

Moreover, in the case of a simple text file, the information stored in the text file may contain very little data, if any data at all, and as such would require very little space for storage in a memory. At least one benefit to converting messages into this format includes improving the performance of a computer in searching, accessing, or managing the messages. While a traditional computer accessing a proprietary message storage using a proprietary application may take seconds or even minutes to find or access a particular file, a computer in the present disclosure can perform the search or access of a particular file in a file management system in a fraction of a second.

As another example, the message received may be a part of a string of text messages or may include a number of attachments (e.g., a multimedia message or email with an attached image, etc.). For instance, the message may include text stating to the second user "I am going to Alice's party, check out this picture of a gift I bought her." The UCMS server 108, in this example, may determine to generate a folder containing one or more files representing various portions of the received message (e.g., the text of the message, the attachment, etc.). The UCMS server 108 may name the folder to include identifiable information about the message. For example, the folder name may be called "FirstUser_Alice_Party." The files in the folder may include one or more files representing content of the message or messages, a summary of the message or messages, attachments, or other information. A first file may be named "Content_FirstTime" to include the content of the messages sent or exchanged between the users in a first time period. A second file may be named "Pic_Gift" and include the image sent from the first user to the second user. In some embodiment, the files or folders described herein may include one or more of descriptive metadata, tags, and other metadata or information about the container of the data (e.g., the file or folder, etc.). This metadata or information may be read, and in some cases edited, via a functionality provided by a standard file management system.

Once a received message has been converted into a UCMS format, the converted message may be stored in a central repository 112 (step 516). In some embodiments, the UCMS server 108 may transmit the converted messages to a repository 112 located apart from the UCMS server 108 across a communication network 104. In one embodiment, the UCMS server 108 may be located across a communication network 104 with a local repository 112 and transmit the converted messages to the repository 112 via a local communication medium communicatively connecting the server 108 and the repository 112. It is an aspect of the present disclosure that a cloud storage platform 132 may be used as the central repository 112. Any reference to a central repository 112 as used herein may refer to at least one memory associated with a cloud storage platform 132. In some embodiments, a sensitivity associated with a message may determine a storage location, access controls, and/or DRAM applied to the converted, or translated, message.

The method 500 may proceed by utilizing analytics for prioritization of converted messages stored in the repository 112 (step 520). The analytics applied by the UCMS server 108 may be used to determine priorities, user behavior, and/or other information associated with messaging and a user. The analytics may prioritize messages in the repository 112 based on an importance of the message to a user, a sensitivity of the message, an encryption associated with the message, and may even render an analytic of personal behavior or context. In some embodiments, the analytics may prioritize or filter messages presented to a user, or rendered via an application to a display associated with a communication device 128, such that a user is aware of which messages are most important to the user (e.g., based on the analytics determinations made by the UCMS server 108, etc.). Performing analytics via the UCMS server 108 saves processing requirements of the communication device, allows for a refined system presentation, and provides the ability to change message information dynamically (e.g., sensitivity, DRAM, priority, etc.).

When a sensitivity of a message changes, based on a result of the application of analytics or some other change (e.g., administrative, policy-based, etc.), the method 500 may continue by selectively providing DRAM to one or more messages (step 524). For example, the UCMS server 108 may selectively apply DRAM to messages based at least partially on the sensitivity, or change in sensitivity, of a message. Additionally or alternatively, the DRAM may be selectively applied to messages based at least partially on which users are permitted, or authorized, to read or delete the message. The method 500 ends at step 528.

Figure 6:
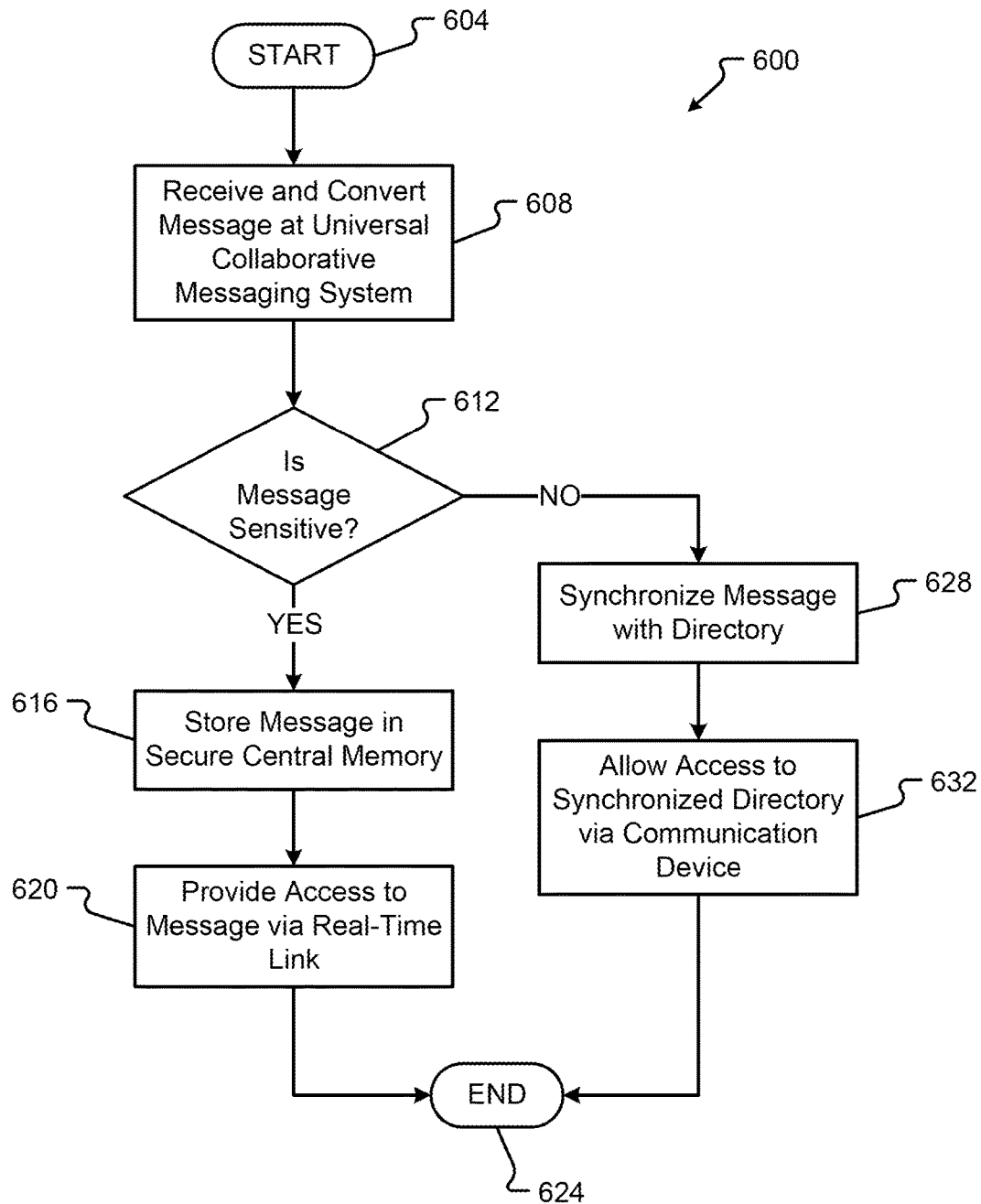
FIG. 6 is a flow diagram depicting a method of segregating sensitive messages in a universal collaborative messaging system in accordance with embodiments of the present disclosure.

FIG. 6 is a flow diagram depicting a method 600 of segregating sensitive messages in a universal collaborative messaging system in accordance with embodiments of the present disclosure. While a general order for the steps of the method 600 is shown in FIG. 6, the method 600 can include more or fewer steps or can arrange the order of the steps differently than those shown in FIG. 6. Generally, the method 600 starts with a start operation 604 and ends with an end operation 624. The method 600 can be executed as a set of computer-executable instructions executed by a computer system and encoded or stored on a computer readable medium. Hereinafter, the method 600 shall be explained with reference to the systems, components, modules, mechanisms, software, data structures, etc., described in conjunction with FIGS. 1-5.

The method 600 begins at step 604 and proceeds when one or more messages are received from one or more sources (step 608). The received message may be converted into a UCMS format for storage in a file management system. Receiving and converting the messages may at least be similar, if not identical, to the receiving and converting of messages described in conjunction with FIG. 5.

Next, the method 600 proceeds by determining whether the message is associated with a sensitivity value (step 612). In some embodiments, the sensitivity of a message may be determined by the UCMS server 108 and stored in the sensitivity information field 416 of a data structure 400 associated with the converted message. Sensitivity information is described above in conjunction with FIG. 4.

Providing the converted message includes a sensitivity value (e.g., "sensitive," "highly sensitive," etc.), the method 600 may continue by storing the message in a secure central memory (step 616). The secure central memory may correspond to a central repository 112 or cloud storage platform 132. In some embodiments, access to sensitive messages may be restricted to particular users, groups of users, devices, groups of devices, and/or combinations thereof. The sensitivity associated with a particular message may require that access only be provided to one or more communication devices 128 employing a real-time communication link (e.g., WebRTC, etc.). This restriction of real-time communication access may be employed when messages are determined to have a high sensitivity value (e.g., where uncontrolled dissemination, distribution, or viewing may be detrimental or undesired by policy, request, setting, etc.).

In the case where a message sensitivity requires real-time communication access by a communication device, the method 600 may continue by providing this access via at least one real-time communication link (step 620). For instance, the UCMS server 108 may transmit a message or instructions to a communication device 128 to run a client application and launch a WebRTC session to the UCMS server 108. This real-time link may allow the user of the communication device 128 to view the message from the host (e.g., the server 108 and repository 112) without transmitting the message to the communication device 128. This process may prevent the message from being copied in any way from the server 108 to the communication device 128 and ensures security for sensitive messages.

In the event that the message at step 612 does not include any sensitivity, the method 600 may proceed by associating the message with a synchronized directory on the repository 112 (step 628). One or more communication devices 128 may include a synchronized directory 232 that is configured to synchronize with the directory in the repository 112. In some embodiments, a directory synchronization service module 332 of the UCMS server 108 may be configured to allow the communication device 128 to synchronize the synchronized directory 232 with the specified synchronization directory stored on the repository 112 (step 632). The synchronization may be performed automatically, for example, on a timed basis, when information is changed or added, in response to a condition, and/or upon request. The method 600 ends at step 624.

In some embodiments, the method 600 may continually monitor for changes in sensitivity to the stored messages. In this example, messages that were saved to a particular location (e.g., a synchronized directory or secure central memory) may be moved to a different location based on the change in sensitivity. Accordingly, the method 600 may return to step 612 upon detecting a change to the sensitivity associated with a message and repeat the steps of the method 600 based on the changed sensitivity.

Figure 7:
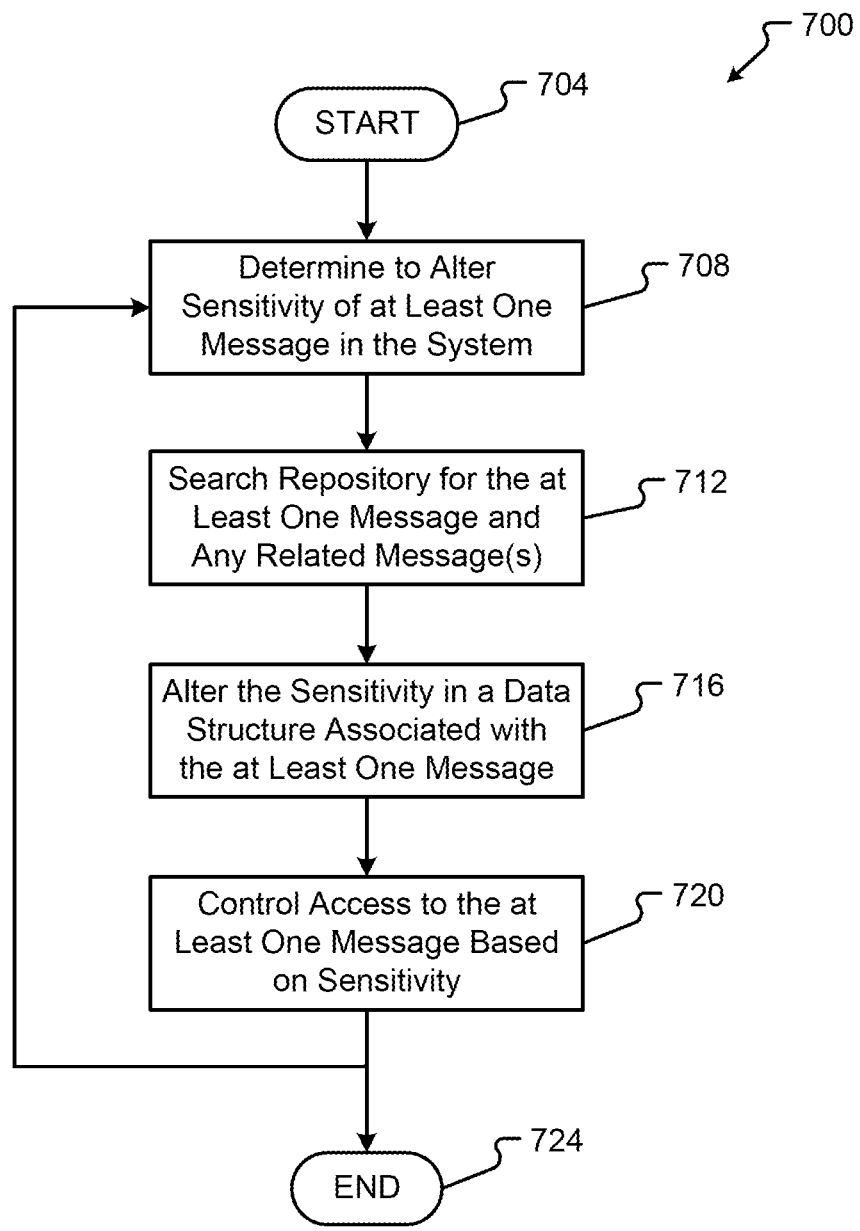
FIG. 7 is a flow diagram depicting a method of dynamically altering the sensitivity of a translated message in a universal collaborative messaging system in accordance with embodiments of the present disclosure.

FIG. 7 is a flow diagram depicting a method 700 of dynamically altering the sensitivity of a translated message in a universal collaborative messaging system in accordance with embodiments of the present disclosure. While a general order for the steps of the method 700 is shown in FIG. 7, the method 700 can include more or fewer steps or can arrange the order of the steps differently than those shown in FIG. 7. Generally, the method 700 starts with a start operation 704 and ends with an end operation 724. The method 700 can be executed as a set of computer-executable instructions executed by a computer system and encoded or stored on a computer readable medium. Hereinafter, the method 700 shall be explained with reference to the systems, components, modules, mechanisms, software, data structures, etc., described in conjunction with FIGS. 1-6.

The method 700 begins at step 704 and proceeds by determining to alter the sensitivity of at least one message controlled by the UCMS server 108 (step 708). In some embodiments, determining to alter the sensitivity of a message may be made by the UCMS server 108 in response to a request submitted to the UCMS server 108 by a communication device 128. In one embodiment, an authorized entity may determine to change the sensitivity of a message due to change in context or condition.

Continuing the method 700, the authorized entity may access the UCMS server 108 and search the repository 112 from the at least one message and any related messages (step 712). In some embodiments, the related messages may linked to the at least one message based on group 116, one or more pointers 126, content, subject, metadata, or other information associated with the message. The messages may be selected automatically via the UCMS server 108 or via the authorized entity making a selection via a user interface element presented to a communication device 128 that is connected to the UCMS server 108.

Next, the method 700 continues by the UCMS server 108 changing the sensitivity information field 416 of the at least one message selected from the repository 112. Once the sensitivity of the at least one message is changed, the UCMS server 108 may determine to control access to the at least one message based on the sensitivity (step 720). Controlling access may include moving the at least one message to a particular storage location (e.g., secure central storage memory, cloud storage platform, synchronized directory, etc.). In some embodiments, controlling access to the at least one message may include applying DRAM to the message. In one embodiment, controlling access may include allowing access to the message only by one or more authorized parties. The one or more authorized parties may be identified in an access permissions data field 424. As can be appreciated, the UCMS server 108 may alter the access permissions data field 424 of the at least one message.

In some embodiments, the method 700 may return to step 708 such that the UCMS server may continually monitor conditions in the UCMS and determine to alter the sensitivity of one or more messages. The method 700 ends at step 724.

It should be appreciated that while embodiments of the present disclosure have been described in connection with an enterprise communication system architecture, embodiments of the present disclosure are not so limited. In particular, those skilled in the contact center arts will appreciate that some or all of the concepts described herein may be utilized in any communication system or any other traditional communication system architecture.

Furthermore, in the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor (GPU or CPU) or logic circuits programmed with the instructions to perform the methods (FPGA). These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Specific details were given in the description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments were described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

While illustrative embodiments of the disclosure have been described in detail herein, it is to be understood that the inventive concepts may be otherwise variously embodied and employed, and that the appended claims are intended to be construed to include such variations, except as limited by the prior art.

What is claimed is:

1. A server, comprising:
   a processor;
   a memory; and
   a universal collaborative messaging system (UCMS) application contained in the memory and executed by the processor, wherein the UCMS application: receives messages from a plurality of different messaging sources, wherein the messages are configured as communications from a sender to at least one recipient including a user; transforms a received message from a first messaging format into a second messaging format compatible with standardized file management systems, wherein the second messaging format is configured as a folder including one or more files, each file of the one or more files representing content of the received message, and wherein a size of the transformed message is less than a size of the received message; stores the transformed message in the second messaging format in a secure central memory in communication with the server, wherein the secure central memory is part of a cloud storage platform; and sends a notification to a communication device of the user, wherein the notification activates a universal message viewing application on the communication device without transmitting the transformed message to the communication device and enables a connection to the secure central memory via the communication device and the server, and wherein the communication device is caused to render at least a portion of the transformed message that is hosted by the server and the secure central memory.

2. The server of claim 1, wherein the UCMS application is further configured to determine a first messaging format of the message, extracting, based on an identification of the first messaging format, content of the received message, wherein the content includes one or more portions of the received message, wherein each portion of the one or more portions is associated with a separate file of the folder, and automatically build the transformed message using only the extracted content of the received message.

3. The server of claim 1, wherein the secure central memory includes at least one shared memory platform administered by a third party, and wherein the at least one shared memory platform is configured with a synchronized directory configured to synchronize the transformed message with the communication device and other authorized client communication devices when the transformed message is identified as being non-sensitive.

4. A method, comprising:
   providing a universal message viewing application to a user for installation on a communication device of the user;
   receiving, at a server, messages from a plurality of different messaging sources, wherein the messages are configured as communications from a sender to at least one recipient including the user;

transforming, by the server, a received message from a first messaging format into a second messaging format compatible with standardized file management systems, wherein the second messaging format is configured as a folder including one or more files, each file of the one or more files representing content of the received message, and wherein a size of the transformed message is less than a size of the received message;

storing the transformed message in the second messaging format in a memory associated with the server and the user, wherein the memory is part of a cloud storage platform; and sending, by the server, a notification to the communication device of the user, wherein the notification activates the universal message viewing application without transmitting the transformed message to the communication device and enables a connection to the memory via the communication device and the server, and wherein the communication device is caused to render at least a portion of the transformed message that is hosted by the server and the memory.

5. The method of claim 4, wherein transforming the received message further comprises:
determining, via the server, a first messaging format of the received message; and
extracting, based on an identification of the first messaging format, content of the received message, wherein the content includes one or more portions of the received message, wherein each portion of the one or more portions is associated with a separate file of the folder.

6. The method of claim 5, further comprising:
building, automatically via the server, the transformed message using only the extracted content of the received message.

7. The method of claim 5, wherein the content of the received message includes information stored in two or more of a header, footer, body, and metadata of the received message.

8. The method of claim 5, further comprising:
determining whether the received message includes a text portion and an attachment;
building the transformed message as the folder including the attachment and a text file representing a simplified file of the text portion when the received message includes the text portion and the attachment; and
building the transformed message as the folder including only the text file representing the simplified file of the text portion when the message does not include the attachment.

9. The method of claim 5, further comprising:
determining whether the received message is an initial message or a subsequent message between the sender and the user, wherein the subsequent message corresponds to an additional message associated with a previous communication between the sender and the user, and wherein the previous communication includes at least one file and folder stored in the memory as a group;
building the transformed message as a first file or first folder for storing in the memory when the received message is determined to be the initial message between the sender and the user; and
building the transformed message as a subsequent file or subsequent folder for storing in the group when the received message is determined to be the subsequent message between the sender and the user.

10. The method of claim 5, further comprising:
generating, via the server, a standardized filename for the transformed message, wherein the standardized filename includes at least a portion of the content extracted from the received message.

11. The method of claim 5, wherein a single instance of the transformed message is stored in the memory, and wherein a pointer file including a link to the single instance of the transformed message is stored in a file management group associated with the user and any other user included as a recipient of the received message.

12. The method of claim 5, further comprising:
determining a sensitivity associated with the received message, wherein the sensitivity is configured to identify one or more of a restricted access, recipient, and distribution, and wherein the sensitivity is associated with a low, medium, or high value.

13. The method of claim 12, wherein the sensitivity of the transformed message is changed in response to automatically determining, by the server, that a sensitivity for a related message to the transformed message has changed.

14. The method of claim 12, wherein the memory associated with the server is different for messages having a low value of sensitivity and messages having a high value of sensitivity.

15. The method of claim 14, wherein the server applies digital rights access management (DRAM) to messages that are transformed from received messages having the high value of sensitivity.

16. The method of claim 15, wherein the notification sent to the communication device of the user requires a real-time communication connection for the communication device to access the memory for rendering transformed messages having DRAM.

17. A universal collaborative communication system, comprising:
a processor; and
a computer readable storage medium having stored thereon instructions that, when executed by a processor, cause the processor to:
receive messages from a plurality of different messaging sources, wherein the messages are configured as communications from a sender to at least one recipient including a user;
determine a sensitivity associated with a received message, wherein the sensitivity is configured to identify whether the received message is subject to a restricted access;
transform the received message from a first messaging format into a second messaging format compatible with standardized file management systems, wherein the second messaging format is configured as a folder including one or more files, each file of the one or more files representing content of the received message and wherein a size of the transformed message is less than a size of the received message;
store the transformed message in the second messaging format in a cloud-based memory, wherein the transformed message is stored in a secure memory location in the cloud-based memory when the received message is identified as being subject to the restricted access; and
send a notification to a communication device of the user, wherein the notification activates a universal message viewing application on the communication device without transmitting the transformed message to the communication device and enables a connection to the cloud-based memory via the communication device and the processor, and wherein the communication device is caused to render at least a portion of the transformed message that is hosted by the processor and cloud-based memory.

18. The system of claim 17, wherein the instructions, when executed by the processor, further cause the processor to:

restrict access to the transformed message via a particular communications connection between the communication device and the server based on the sensitivity associated with the received message.

19. The system of claim 17, wherein the instructions, when executed by the processor, further cause the processor to:

determine a change to the sensitivity associated with the received message, wherein the change includes increasing a sensitivity level from a first level to a higher second level; and apply rights access management to the transformed message stored in the cloud-based memory, restricting access to the transformed message from one or more unauthorized users.

20. The system of claim 17, wherein prior to receiving the at least one message, the instructions, when executed by the processor, further cause the processor to:

register the processor as a messaging client of the user with each of the plurality of different messaging sources.

* * * * *